Jan. 23, 1968     E. F. CAMBRIA     3,364,779
GEAR SHIFT MECHANISM
Filed Jan. 20, 1966     6 Sheets-Sheet 1

FIG-1-

INVENTOR.
EMANUEL F. CAMBRIA
BY
ATTORNEY

Jan. 23, 1968  E. F. CAMBRIA  3,364,779
GEAR SHIFT MECHANISM

Filed Jan. 20, 1966  6 Sheets-Sheet 4

INVENTOR
EMANUEL F. CAMBRIA
BY
ATTORNEY

Jan. 23, 1968  E. F. CAMBRIA  3,364,779
GEAR SHIFT MECHANISM
Filed Jan. 20, 1966  6 Sheets-Sheet 6

INVENTOR
EMANUEL F. CAMBRIA
BY
ATTORNEY

United States Patent Office 3,364,779
Patented Jan. 23, 1968

3,364,779
GEAR SHIFT MECHANISM
Emanuel F. Cambria, Philadelphia, Pa., assignor to Hurst-Campbell, Inc., Warminster, Pa., a corporation of Pennsylvania
Filed Jan. 20, 1966, Ser. No. 521,918
6 Claims. (Cl. 74—473)

My invention relates to a gear shift mechanism for an automatic transmission of the type used in connection with automobile and other engines.

In non-automatic transmissions, the shifting mechanism follows what is known as the H-pattern which involves moving the shifting stick across the neutral gate and, as can be seen from Patent No. 3,172,301, for example, the gear shifting mechanism of a three forward speed transmission includes two selector plates, or levers, one for shifting to low speed forward gear and to reverse, and the other for shifting to second and third forward speeds. For a four forward speed transmission, a third selector lever is used for shifting to reverse and the other two levers are used for shifting to first and second and to third and fourth forward speed, respectively.

An automatic transmission is shifted from park, to reverse, to neutral, to the normal forward "drive" position (which up-shifts and down-shifts automatically) and to non-shifting "low" drive, by a single actuating lever which has a unidirectional movement. Such a transmission is very satisfactory for most purposes but, because it up-shifts and down-shifts automatically in response to the speed of the vehicle, it deprives the driver of the power to select and maintain the desired gear ratio.

In order to enable the driver to select and maintain the desired gear ratio, manually operated gear shifting mechanisms which permit the driver to place the transmission and to maintain it in first, second, third or fourth forward speed gear ratios, have been used. But because in an automatic transmission, the activating lever moves unidirectionally, the span of movement of the shifting stick, from park to third—or to fourth—forward speed gear ratio, becomes undesirably long. For instance, if park position is at the front end and third—or fourth—forward speed position is at the rear end of a straight path of movement, the driver will have to reach too far forward and too far back.

It is therefore the object of the invention to produce an improved gear shift mechanism whereby the linear movement of the transmission actuating lever is effected by a non-linear movement of the shifting stick.

More specifically, the invention resides in providing a mechanism wherein the shifting stick is moved in a generally U-shaped path so that the shifting stick is moved along one limb of the U to shift from park, to reverse, to neutral and back, and so that the shifting stick is moved along the other limb of the U to shift from second to third—and to fourth and back, the stick being moved to the bight portion of the U to shift to low, or first gear position.

The full nature of the invention will be understood from the following specification and accompanying drawings in which.

Figure 1:
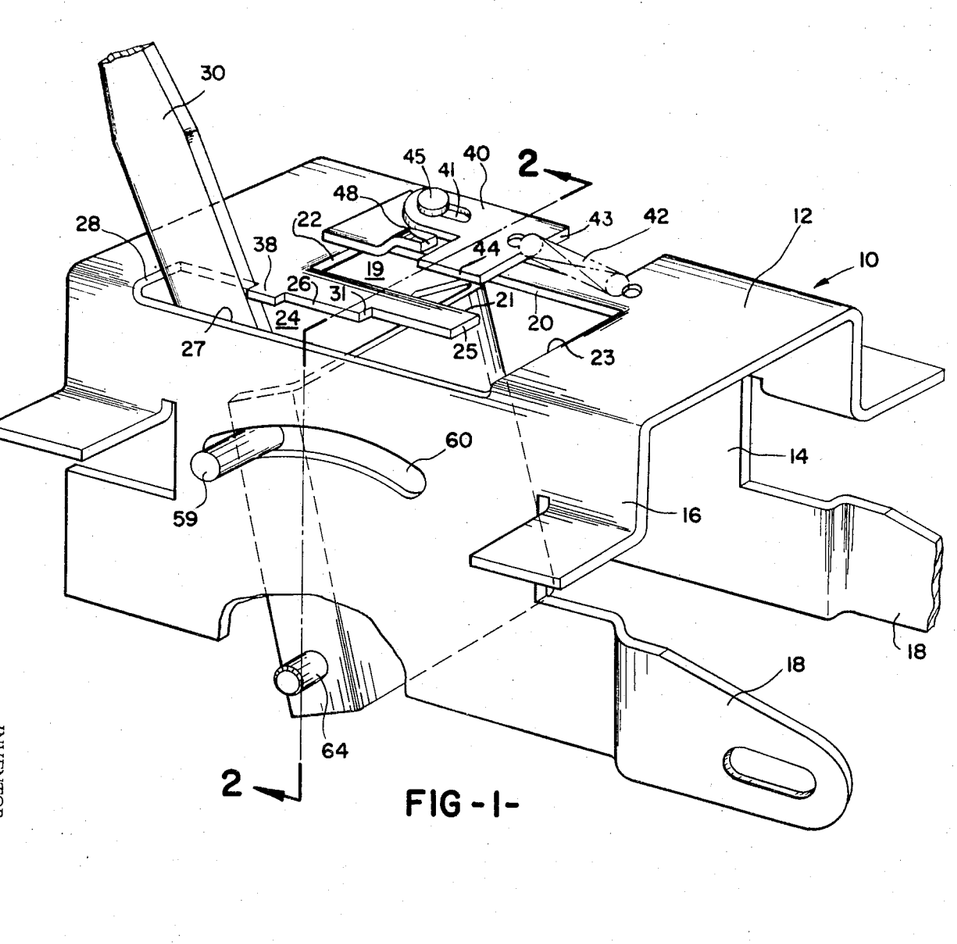
FIG. 1 is a fragmentary, perspective view of a gear shifting mechanism embodying my invention.

As above stated, the object of the invention is to shorten the forward and backward movement of the shifting stick while maintaining the in-line movement of the single transmission actuating lever which shifts from park to reverse, to neutral, and to the forward speed gear positions. The manner in which this is accomplished is shown in FIG. 1 which shows a frame 10 formed of a top wall 12 and side walls 14 and 16, the latter having ears 18 whereby the frame can be mounted in operative position relative to the transmission. The top wall 12 is provided with a slot 19 defined by side walls 20, 21, and end wall 22 and by the adjacent part of wall 23 and with a parallel slot 24 which is defined by similar walls 26, 27, and 28 and by the adjacent part of previously mentioned wall 23. As can be seen from FIG. 1, the gear shifting stick 30 can be moved rearwardly, or from the position in which it abuts edge 28 to a position in which it abuts edge 23. The shifting stick is also movable laterally along wall 23 until it abuts the adjacent part of wall 20. This movement brings the shifting stick into registration with the rear end of slot 19. By this arrangement, the shifting stick can be moved from park, to reverse, to neutral, and back, without leaving slot 24, and it can be moved to second, third and fourth forward speeds, and back, without leaving channel 19. For convenience, these positions are marked "P," "R," "N," "1," "2," "3" and "4" respectively. It will be noted that when the shifting stick is in the slot defined by walls 23 and 25, the transmission will be in first gear position and that movement of the shifting stick back and forth over the entire surface of wall 23 will not take the transmission out of first gear position.

It is thus clear that, by dividing the stations into two groups arranged in parallel adjacent slots, the shifting stick need only be moved forwardly and rearwardly, through one-half of the distance through which the stick would have had to be moved were all the stations, from "park" to fourth forward speed gear position, arranged linearly.

Figure 2:
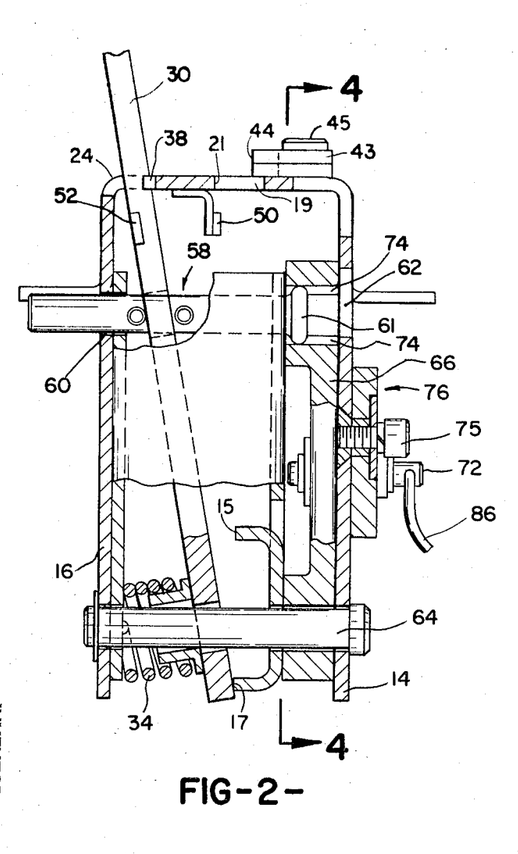
FIG. 2 is a sectional view looking in the direction of line 2—2 on FIG. 1 and showing the shifting stick in the position which it occupies while being moved from park to reverse, to neutral position, and back.
Figure 3:
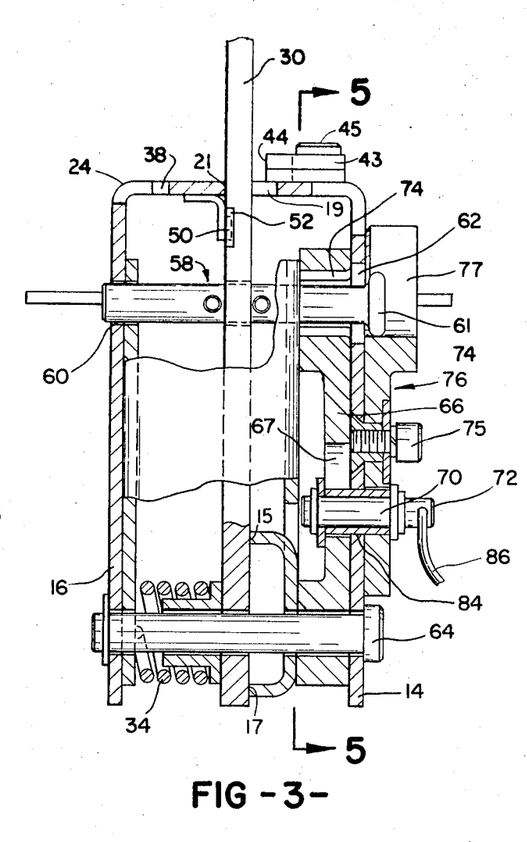
FIG. 3 is similar to FIG. 2 but showing the position of the shifting stick in the position it occupies while it is moved from first to second to third to fourth forward speed positions and back.

From FIGS. 2 and 3, it will be seen that the shifting stick 30 is constantly biased to the right by a spring 34, so that, when the stick is in slot 24 and is unrestrained, it will always abut the right-hand wall 26 thereof. It will also be seen from FIG. 1 that slot 24 is provided with lug 38 which prevents movement of the shifting stick from park to reverse unless the stick is moved to the left, against the basing of spring 34, far enough to clear the lug. By this arrangement, the driver cannot unintentionally slip from park to reverse gear position, or vice versa.

Figure 7:
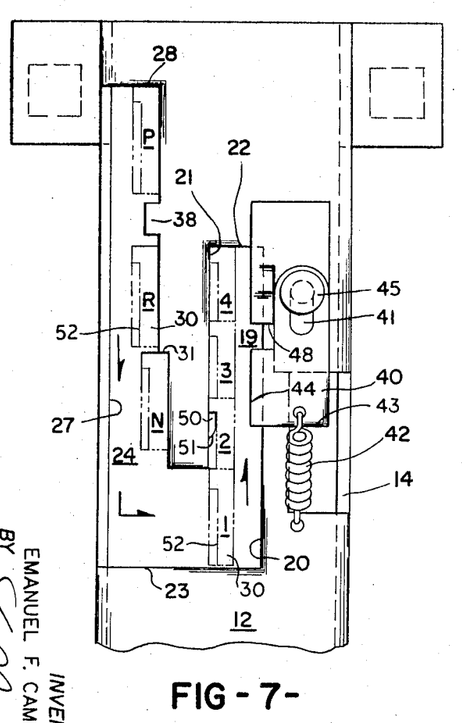
FIG. 7 is a diagrammatic top plan view, with the outer casing, and showing the movement of the shifting stick along a U-shaped path.
Figure 8:
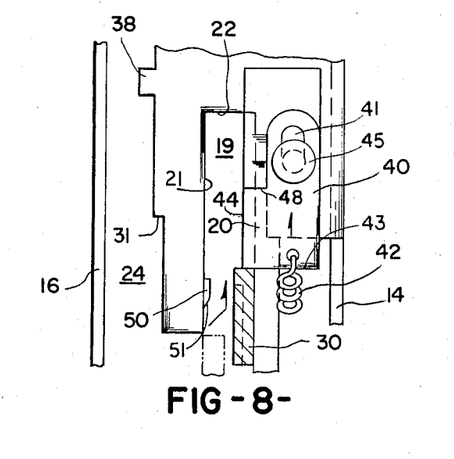
FIG. 8 is a view of central portion of FIG. 7 and showing the manner of shifting from first to second gear position.
Figure 9:
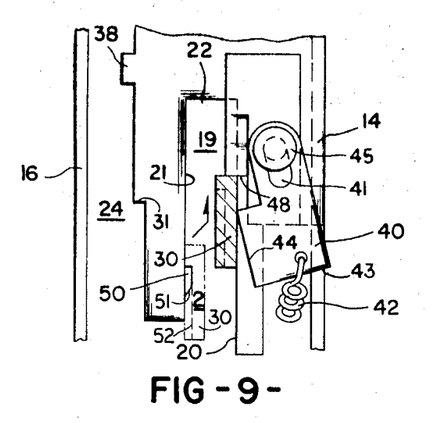
FIG. 9 is similar to FIG. 8 but shows the manner of shifting from second to third gear position.
Figure 10:
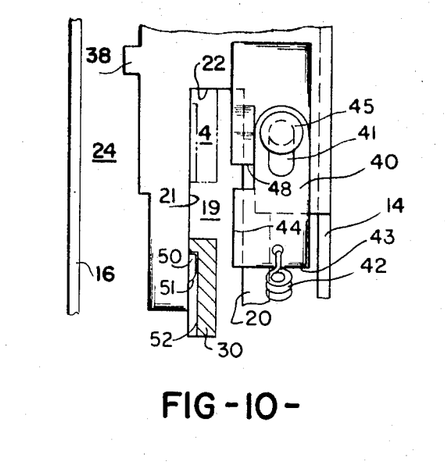
FIG. 10 is similar to FIG. 8 but showing the manner of shifting from fourth back to third gear position.

Similarly, when the shifting stick is moved into slot 19, it will be biased by spring 34 toward the right-hand side of slot 19, but because, when so moved the stick abuts stops 15 and 17, it will be held in a substantially vertical position, FIG. 3, in which it will be freely slidable against the left-hand wall 21 of slot 19. The actual shifting of the stick in slot 19, through the forward gear positions, can be performed in one of two ways. Under non-competitive, or normal driving conditions, shifting stick 30 need only be moved forwardly along wall 21 to shift from first to fourth gear position, FIG. 7, without the necessity of having the driver exert any lateral force on the stick. In down-shifting, the stick can be moved rearwardly of said slot, along wall 21, from fourth to third gear position but, unintended movement of the shift stick beyond second gear position is prevented by a stop 50 which is adapted to be engaged by shoulder 52 which is formed by cutting out, or notching, the adjacent side of the stick, FIG. 10. It will be noted that stop 50 is bevelled as at 51 to permit in line shifting. However, for rapid shifting are needed. To enable the driver to "slam" the shifting stick into second gear position and to hold the stick in that position, a latch 40 is provided which has a slot 41 therein through which passes a fixed pin 45 whereby said latch is rotatable about and slidable relative to said pin. Latch 40 is normally biased rearwardly by spring 42 so that its edges 43 and 44 protrude beyond wall 20 of slot 19. To "speed shift" from first into second gear position, the driver pushes the stick to the right and forwardly, against the biasing of spring 34 along wall 20 until the stick engages edge 43 and moves latch 40 forwardly as far as it will go or to the position of FIG. 8. In order to shift into third gear position, the driver moves the shifting stick to the left whereby spring 42 returns latch 40 to its normal position. He then moves the stick forwardly and to the right to abut edge 44 to rotate latch 40 out of the way as shown in FIG. 9. This allows the stick to move forwardly until it abuts stop 48 or to third gear position. To shift into fourth gear position, the driver need only move the shifting stick to the left until it clears stop 38 whereby he can move the stick forward until it abuts rear wall 22 or to fourth gear position. Down-shifting from fourth gear position is done as previously described. After clearing stop 50, the shift stick can be moved to first gear position in which it can be moved the entire length of wall 23 without leaving first gear. From first gear position, the shift stick can be moved to neutral position by moving said stick forwardly in slot 24 until it abuts shoulder 31. From the neutral position, the stick is moved to reverse position by moving the stick against the action of spring 34 until it clears shoulder 31 and by moving the stick forwardly until it abuts lug 38. Similarly, to move the stick from reverse position to park position, the stick is moved against the spring action to clear lug 38 and is then moved forwardly until it abuts rear wall 28 of said slot.

It is clear that the U-shaped arrangement above described is readily adaptable to any transmission which is manually shiftable to six or seven positions so as to shorten the stroke of the shift stick.

Figure 4:
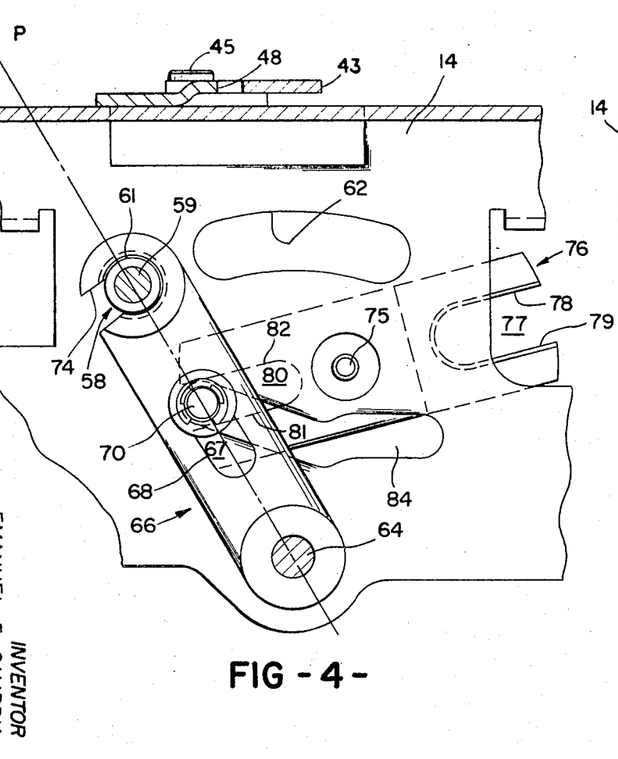
FIG. 4 is a sectional view looking in the direction of line 4—4 on FIG. 2 and showing the position of the selector levers when the shifting stick is in park position.
Figure 5:
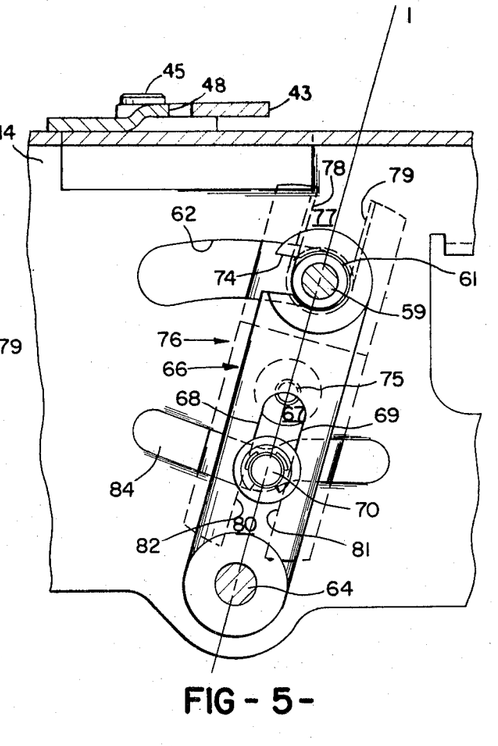
FIG. 5 is a sectional view looking in the direction of line 5—5 on FIG. 3 and showing the position of the selector levers when the shifting stick is in first forward speed gear position.
Figure 6:
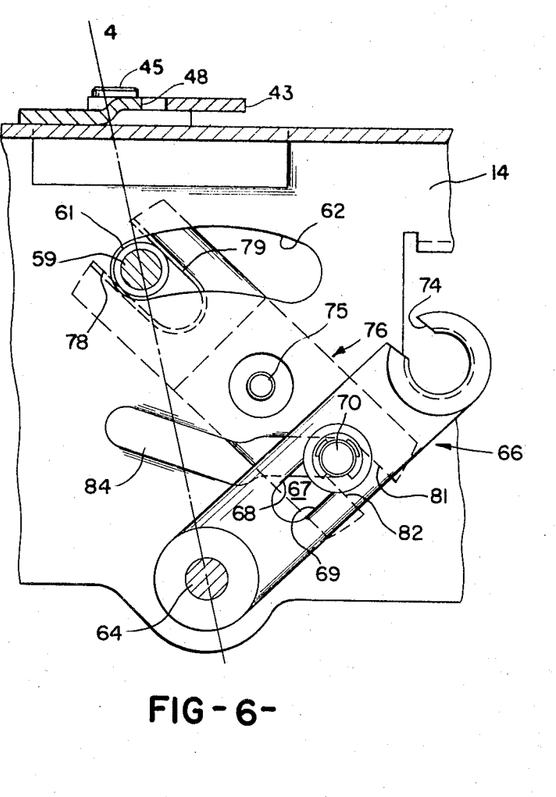
FIG. 6 is similar to FIG. 4 but showing the shifting stick in fourth forward speed gear position.
Figure 6A:
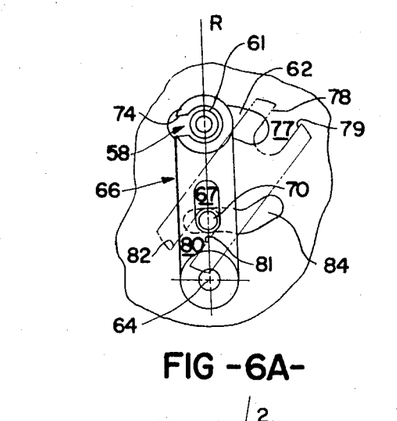
FIGS. 6A, 6B, 6C and 6D are diagrammatic views showing the positions of the selector levers when the shifting stick is in reverse, neutral, second and third positions respectively.
Figures 6B, 6D, 11:
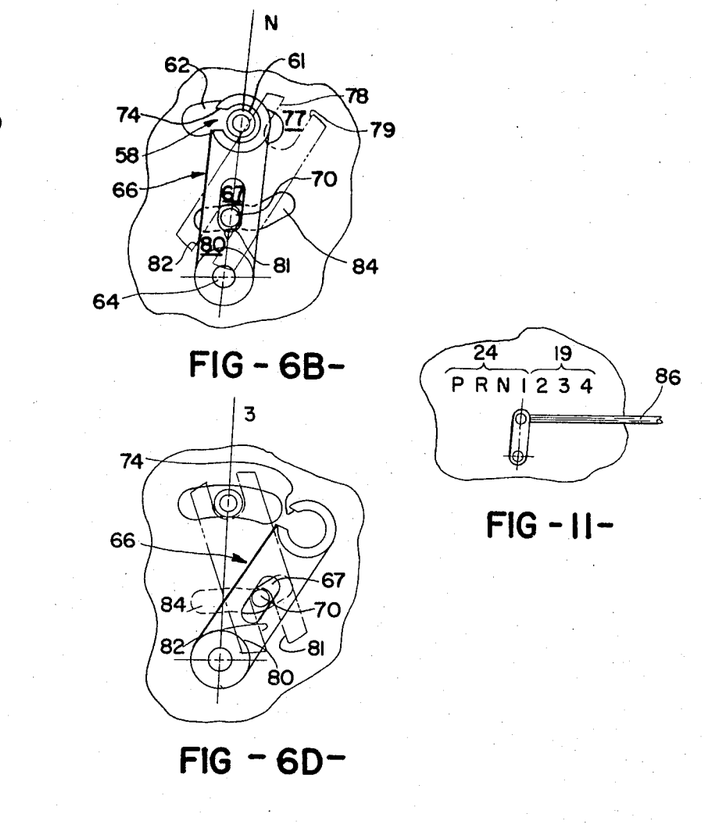
FIG. 11 is a fragmentary and diagrammatic view of that part of the transmission which is controlled by the shifting mechanism.

In the automatic transmission to which the invention has been successfully applied, the shifting stick is connected to the transmission actuating lever 90 by means of a flexible shaft 86, or cable, as shown in FIG. 11, which is enclosed in a shield so as to combine flexibility with the desired rigidity. The mechanical means for operatively connecting the shift stick to the actuating lever is shown in FIGS. 2–6 in which it will be seen that the lower end of the shift stick rotatably engages assembly pin 64 which is fixedly carried by walls 14 and 16 and which also carries the previously mentioned handle biasing spring 34. Above the assembly pin, the stick carries a selector pin 58, one end of which moves in and out of a guide slot 60 formed in side wall 16 and the other end of which has an enlarged diameter to form an engaging head 61. On the inner side of side wall 14 is a selector lever 66 which is provided with a slot 67 for movably receiving a stud 70, to the outer end 72 and to which is connected one end of a cable 86, the other end of which is connected to the previously mentioned transmission actuating lever 90. The lower end of lever 66 is pivoted on assembly pin 64 and the upper end of said lever is formed into a hook 74 for engagement with, and disengagement from, selector pin 58. On the outer side of wall 14 and pivoted thereto by pin 75, is another selector lever 76 which is provided with end notches 77 and 80, the former being detachably engageable with selector pin 58 and the latter permanently engaging stud 70. Side wall 14 is also provided with an elongated slot 84 for movably receiving stud 70, said slot being formed of two connected portions, the axes of which form a slight angle as shown in FIGS. 4–6. As best seen in FIG. 3, stud 70 extends through and pivotally connects, levers 66 and 76, and is slidable in slot 84.

The relation of the parts above described is perhaps best explained by tracing the movement of the gear selecting mechanism, which is as follows:

As long as the shift stick is in slot 24, head 61 of selector pin 58 will only engage the hook 74 at the end of lever 66. In park position, the stick is in the extreme forward portion of slot 24 as viewed in FIG. 1 and lever 66 is in extreme left position, as viewed in FIG. 4. It will be noted that in this position of the stick, stud 70 is located at the extreme left end of slot 84, at the upper end of slot 67 in lever 66, and is at the mouth of notch 80 in selector lever 76 which will be in the position shown in FIG. 4. As the shift stick is moved rearwardly of slot 24, or from park position into reverse gear, lever 66 is rotated, in clockwise direction by head 61 of selector pin 58, from the position of FIG. 4 to that of FIG. 6A. This movement of lever 66 causes the edge 68 of slot 67 to bear against, and to move, stud 70 to the right in slot 84, or towards the mid-portion of slot 67 and part-way into notch 80. In so moving, stud 70 bears against the edge 81 of notch 80 which forces lever 76 to rotate about pin 75. Continued rearward motion of the shift stick in slot 24 moves it from reverse, into neutral gear position as seen in FIGS. 6A and 6B. It is noted that lever 66 continues its clockwise rotation and edge 68 of slot 67 continues to bear against stud 70, thus forcing said stud to move further, to the right, relative to slot 84; toward the bight of notch 80, and toward the lower portion of slot 67. The movement of stud 70 against edge 81 of notch 80 forces lever 76 to continue to rotate counter-clockwise. When shift stick 30 reaches the extreme rearward portion of slot 24 and abuts edge 23, the stick will have moved from neutral into first gear position. FIGS. 6B and 5. This movement of the stick further rotates lever 66 and moves stud 70 to about the middle of slot 84; to the bight portion of notch 80, and to the lower portion of slot 67. The movement of stud 70 against edge 81 of slot 80 causes lever 76 to rotate counter-clockwise until it aligns with lever 66 as shown in FIG. 5.

It should be noted that the rearward movement of the stick through the entire length of slot 24 or from park to first gear position moves stud 70, linearly and unidirectionally, only to about the middle of slot 84. Since stud 70 is connected by cable 86 to the transmission actuating lever 90, the above mentioned movement of the shift stick and the consequent movement of the stud through one-half the length of slot 84 result in also moving actuating lever 90 from park to first gear position. Stud 70 is moved the remaining length of slot 84 by the forward movement of the stick through the entire length of slot 19 or from first to fourth gear position. As will be subsequently explained, the movement of the stick across the bight portion of the U-shaped slot, out of alignment with the rearward end of slot 24 and into alignment with the rearward end of slot 19 does not take the transmission out of first gear position.

Figure 6C:
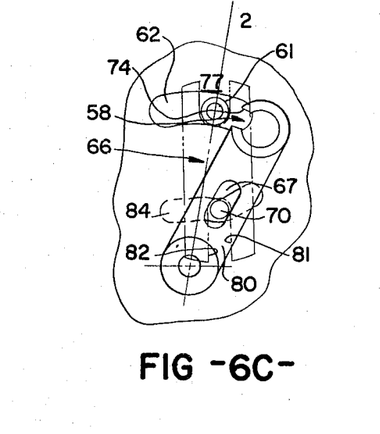

This is due to the fact that in the first gear position, levers 66 and 76 are aligned with each other and with the extreme right portion of slot 62 in wall 14, FIG. 5. Therefore, movement of the shift stick along the entire length of edge 23, FIGS. 2 and 3, moves selector pin 58 to the right and moves head 61 out of engagement with lever 66, through slot 62 and into engagement with notch 77 of lever 76, and body 59 of pin 58 is moved into hook end 76. This movement of the stick does not affect the first gear position because only the movement of stud 70 in slot 84 will move cable 86 and actuate lever 90 which effects selection of transmission gear positions and because stud 70 will not move relative to slot 84 except when the stick is moved longitudinally of slot 24 or 19. When the shift stick is moved forwardly of slot 19 from first to second gear position, FIGS. 5 and 6C, the body 59 of pin 58 moves out of hook end 74. This permits head 61 to bear against edge 78 of slot 77 to rotate lever 76 about pin 75 counter-clockwise. This movement of lever 76 causes edge 82 of slot 80 to bear against and to move stud 70 from its mid-position in slot 84 linearly to the right, or toward the mouth of slot 80 and toward the mid-portion of slot 67. In so moving, stud 70 bears against edge 69 of slot 67, to rotate lever 66 clockwise about pin 64. Further forward movement of said stick into third gear position, FIG. 6D, continues the counter-clockwise and clockwise rotation of levers 76 and 66, respectively, and edge 82 of slot 80 continues to bear against stud 70, thus moving it further to the right within slot 84, or upwardly of slot 67 and toward the mouth of notch 80. Movement of the stick from third gear position to fourth gear position, FIGS. 6D and 6, moves pin 58 to the extreme left position in slot 62 and against edge 78 of slot 77 to further rotate lever 76 counter-clockwise, which causes edge 82 of slot 80 to move stud 70 to the extreme right position within slot 84, or to the extreme upper positions in slot 67 and to the mouth of notch 80. As seen in FIG. 6, lever 76 has moved to the left end of its arc of motion and the movement of stud 70 against edge 69 of slot 67 has rotated lever 66 clockwise to the right end of its arc of motion. The forward movement of the stick through the entire length of slot 19 or from first to fourth gear position moves stud 70 the remaining length of slot 84, and cable 86 moves transmission gear actuating lever 90 unidirectionally, from first to fourth gear positions.

It is apparent that when the shift stick is moved from fourth gear position back to park position, the reverse mechanical sequence follows. It will be remembered that, in first gear position, levers 66 and 76 are aligned, FIG. 5, and that as the stick is moved along edge 23 from alignment with slot 19 into alignment with slot 24, head 61 of selector pin 58 is moved out of engagement with lever 76, and through slot 62, to engage hook end 74 of lever 66. Forward motion of the stick within slot 24 will not disengage pin 58 from lever 66 because head 61 has a larger diameter than the opening of hook end 74.

It should be noticed that since levers 66 and 76 both tightly engage stud 70, it follows that if one lever is engaged by pin 58, the other lever will be immovable except with the movement of the pin and vice versa.

It will be seen from the foregoing that, by my invention, the movement of the shifting stick is reduced to about half the distance through which it would have to be moved to shift a straight line transmission from park to fourth forward speed or back and that this is accomplished by merely providing selector lever 66 and 76 and interconnecting them in such a manner as to move common stud unidirectionally while the shifting stick is moved in over a U-shaped path.

What I claim is:

1. A manual gear shifting mechanism for controlling a vehicle automatic transmission which has at least one non-driving position and which is shiftable from said non-driving position into reverse gear position and into at least three forward speed gear positions, by linear movement of a single gear actuating lever in one direction and is shiftable from said forward speed positions into reverse and into said non-driving position by linear movement of said actuating lever in the opposite direction, said shifting mechanism including:
a housing,
a generally U-shaped slot formed in said housing with the limbs of the U extending forwardly and rearwardly with reference to the orientation of the vehicle and with the bight portion of the U extending transversely, and connecting the rear ends, of said limbs,
a manually operable shifting stick reciprocable in each of said limbs and in said bight portion, and
means connecting said shifting stick to said actuating lever and operative to translate the movement of said stick in one of said limbs, in one direction, into movement of said actuating lever a pre-determined distance in a corresponding direction, and to translate movement of said stick in the other of said limbs, in a direction opposite to said one direction, to further move said actuating lever in said one direction.

2. A manual gear shift mechanism for an automatic vehicle engine transmission of the type which includes park, reverse, neutral and four forward speed positions and which is shiftable into said positions, and in the order named and back, by the linear movement in opposite directions, of an actuating lever operatively connected to said transmission, said mechanism comprising a housing having:
a first and a second spaced, parallel slot extending forwardly and rearwardly of said vehicle, and a third slot connecting the rear ends of said first and second slots,
a gear shift stick mounted for movement forwardly and rearwardly of said first slot, and for movement in said third slot between the rear ends of said first and second slots, and
control means for connecting said shift stick to said actuating lever whereby rearward movement of said shift stick in said first slot, moves said actuating lever in one direction to shift from park position, through reverse and neutral position and into first gear position, and vice versa; whereby the shift stick is movable across said third slot without coming out of first gear, and whereby movement of the shift stick forwardly in said second slot moves said actuating lever in said one direction, to shift from first, to second, third and fourth forward speed gear positions and vice versa, said control means including:
a selector pin carried by said shift stick and having an engaging head,
a first selector lever pivoted near one end thereof for rotation about a first axis and having a hook-like member at its other end for detachably engaging said head,
therebeing an elongated opening in said first lever intermediate its ends,
a second lever pivoted intermediate its ends for rotation about a second axis,
therebeing a first elongated notch in one end thereof engageable with said engaging head and a second elongated notch in the other end thereof,
a stud extending through the opening in said first lever and through said second notch, whereby clockwise rotation of said first lever by rearward movement of said shifting stick in one direction in said first slot will move said stud in one direction and whereby counter-clockwise rotation of said second lever in forward direction in said slot will move said stud further in said one direction, and a cable connecting said stud and said actuating lever, to move the latter according to the movement of said stud.

3. A manual gear shifting mechanism for controlling an automatic transmission of the type which is shiftable from park into reverse and from reverse into neutral gear position, and from neutral into first, second, third and fourth forward gear position, in the order named, by linear movement of an actuating lever in one direction, which transmission is shiftable back, in reverse order, by the linear movement of said actuating lever in the opposite direction, said shifting mechanism including:

a housing, there being parallel first and second slots formed in said housing and extending forwardly and rearwardly with reference to the orientation of the vehicle and a third slot extending transversely, and connecting the rear ends, of said first and second slots, said first slot providing park, reverse, neutral and first gear positions and said second slot providing second, third and fourth forward gear positions, a manually operable shift stick reciprocable in said first, or in said second, slot, a selector pin carried by said shift stick and having an engaging head, a first selector lever pivoted, at one end thereof, for rotation about a first axis and in a plane parallel to the plane of movement of said shift stick, therebeing an elongated opening in said first lever intermediate its ends, and an opening at the other end of said first lever and engageable with the head of said pin when said shift stick is in said first slot, whereby forward and rearward movement of said stick in said first slot will rotate said first lever accordingly, a second selector lever pivoted, intermediate its ends, for rotation about a second axis and in a plane parallel to the plane of rotation of said first lever, and having a first notch at one end thereof for detachably engaging the head of said pin when said shifting stick is in said second slot whereby forward and rearward movement of said stick in said second slot will rotate said second selector lever accordingly, therebeing a second elongated notch at the other end of said second lever, a stud passing through, and engaging the opposite walls of, said opening and said second notch, and a link connecting said stud with said actuating lever whereby, rearward movement of said shift stick in said first slot will rotate said first lever in one direction and will move said stud and said actuating lever in one direction and whereby reverse movement of said stick in said second slot will rotate said second lever in a direction opposite to the direction of rotation of said first lever and will move said stud and said actuating lever in, said one direction.

4. A manual gear shifting mechanism for controlling an automatic transmission of the type which is shiftable to a non-driving position to reverse gear position, to first, second, third and fourth forward speed gear position, in the order named, by the linear movement of an actuating lever in one direction and which is shiftable, in the reverse order, by the linear movement of said actuating lever in the opposite direction, said mechanism including:

a shift stick mounted for selective reciprocation in a first plane or in a second plane spaced from, and parallel to, said first plane, a selector pin carried by said shift stick, a first selective lever pivoted at one end thereof, for rotation about a first axis in a third plane spaced from, and parallel to, the planes of rotation of said stick, a second selector lever pivoted intermediate its ends, for rotation about a second axis in a fourth plane spaced from, and parallel to, said third plane, therebeing a first opening in one end of said first lever engageable with said selector pin only when said shift stick is in said first plane, whereby the reciprocation of said stick in said first plane rotates said first lever in said third plane, and a second opening in the corresponding end of said second lever engageable with said selector pin only when said stick is in said second plane, whereby reciprocation of said stick in said second plane rotates said second lever in said fourth plane, therebeing a third opening in said first lever intermediate its ends and a fourth opening in the other end of said second lever, a stud passing through, and engaging the side walls of said third and fourth openings, whereby rotation of said first lever by movement of said stick in said first plane, accordingly, but oppositely, rotates said second lever and moves said stud in one direction, and whereby movement of said shift stick in said second plane, accordingly, but oppositely, rotates said first lever to move said stud further in said one direction, the arrangement being such that movement of said stick into first gear position will move said first and second levers into alignment with each other and will engage said selector pin with both of said first and second openings, the arrangement being further that movement of said stick from, and to, said first and second planes will not move said first and second lever relative to each other, and a cable connecting said stud with said actuating lever to move the latter accordingly.

5. A manual gear shifting mechanism for controlling an automatic transmission of the type which is shiftable from park into reverse and from reverse into neutral gear position, and from neutral into first, second, third and fourth forward gear position, in the order named, by linear movement of an actuating lever in one direction, which transmission is shiftable back, in reverse order, by the linear movement of said actuating lever in the opposite direction, said shifting mechanism including:

a housing, therebeing parallel first and second slots formed in said housing and extending forwardly and rearwardly with reference to the orientation of the vehicle and a third slot extending transversely, and connecting the rear ends, of said first and second slots, said first slot being arranged to provide park, reverse, neutral and first gear positions, and said second slot to provide second, third and fourth gear positions, a manually operable shift stick reciprocable in said first slot or said second slot, a spring means biasing said shift stick against one side of said first slot, the other side being uninterrupted to allow movement of said stick from said first gear position to neutral position and back, a first shoulder extending from said other side of said slot and disposed in the path of movement of said shift stick from neutral to reverse position, whereby said stick is prevented from movement into reverse position until said stick is moved against the biasing of said spring to clear said first shoulder, and a second shoulder extending from said other side of said slot and disposed in the path of movement of said shift stick from reverse into park position, whereby said stick is prevented from movement into park position until said stick is moved against the biasing of said spring to clear said second shoulder, said shift stick being movable along the one side of said slot in an uninterrupted straight line path from park position to first gear position.

6. A manual gear shifting mechanism for controlling an automatic transmission of the type which is shiftable from park into reverse and from reverse into neutral gear position, and from neutral into first, second, third and fourth forward gear position, in the order named, by linear movement of an actuating lever in one direction, which transmission is shiftable back, in reverse order, by the linear movement of said actuating lever in the opposite direction, said shifting mechanism including:

a housing, there being parallel first and second slots formed in said housing and extending forwardly and rearwardly with reference to the orientation of the vehicle and a third slot extending transversely, and connecting the rear ends, of said first and second slots, said second slot being arranged to provide first, second, third and fourth forward speed gear positions, a manually operable shift stick reciprocable in said second slot, a spring means biasing said lever toward one side of said slot, a lug protruding from said one side of said slot and disposed in the path of movement of said shift stick at said second gear position, the rearward end of said lug being bevelled to permit straight line up-shifting by uninterrupted movement of the shift stick along said one side of said slot from first to fourth gear position, the forward end of said lug being provided with a square shoulder to prevent uninterrupted downshifting from fourth to first gear position unless the stick is moved to clear said lug, a latch, means mounting said latch adjacent the other side of said slot for longitudinal movement relative to said slot, a spring biasing said latch rearwardly, said latch being so located that a first edge thereof overlaps the portion of said other side of said slot between said first and second gear positions, whereby movement of said stick from first toward second gear position engages said stick with said first edge and moves said latch forwardly a fixed distance to permit movement of said stick to second gear position, means mounting said latch for rotary movement about an axis located adjacent said other side of said slot with a second edge of said latch overlapping the portion of said other side of said slot between second and third forward gear positions, whereby said latch is movable out of the path of said stick to permit shifting from second, into third gear position, and a stop projecting from said other side of said slot and disposed in the path of movement of said stick from third to fourth gear position, whereby said stick is prevented from moving into fourth forward gear position until it is moved toward said one side to clear said stop.

References Cited

UNITED STATES PATENTS 2,369,690  2/1945  Roth _______________ 74—565
3,292,450  12/1966  Hurst et al. __________ 74—473

MILTON KAUFMAN, *Primary Examiner.*